US009055462B2

(12) United States Patent
Suenaga

(10) Patent No.: US 9,055,462 B2
(45) Date of Patent: Jun. 9, 2015

(54) SIGNAL GENERATION DEVICE, MOBILE COMMUNICATION TERMINAL TEST DEVICE INCLUDING THE SAME, SIGNAL GENERATION METHOD, AND MOBILE COMMUNICATION TERMINAL TEST METHOD

(71) Applicant: ANRITSU CORPORATION, Kanagawa (JP)

(72) Inventor: Akihiko Suenaga, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 14/168,141

(22) Filed: Jan. 30, 2014

(65) Prior Publication Data

US 2014/0233623 A1 Aug. 21, 2014

(30) Foreign Application Priority Data

Feb. 18, 2013 (JP) ................................ 2013-028870

(51) Int. Cl.
*H04L 27/28* (2006.01)
*H04W 24/02* (2009.01)
*H04L 27/26* (2006.01)

(52) U.S. Cl.
CPC ........... *H04W 24/02* (2013.01); *H04L 27/2601* (2013.01)

(58) Field of Classification Search
CPC ............ H04L 27/2601; H04L 27/2628; H04L 27/263; H04L 27/2634; H04L 27/2646
USPC ......................................................... 375/260
See application file for complete search history.

(56) References Cited

U.S. PATENT DOCUMENTS

2010/0325184 A1* 12/2010 Kanayama et al. ........... 708/300
2011/0053516 A1 3/2011 Harteneck

FOREIGN PATENT DOCUMENTS

JP 11-186973 A 7/1999
JP 2006-029862 A 2/2006

* cited by examiner

*Primary Examiner* — Kevin Kim
(74) *Attorney, Agent, or Firm* — Pearne & Gordon LLP

(57) ABSTRACT

To provide a mobile communication terminal test device that can generate a signal with amplitude-frequency characteristics or phase-frequency characteristics which are changed over time. A mobile communication terminal test device 10 includes a data generation unit 12 that generates a bit stream, a sub-carrier generation unit 31 that receives bit stream data and performs, for example, predetermined encoding, symbol mapping, or sub-carrier mapping to convert the received data into a plurality of sub-carriers based on an OFDM modulation system, a frequency characteristic storage unit 13 that stores table data for predetermined amplitude-frequency characteristics and phase-frequency characteristics, and a frequency characteristic calculation unit 32 that sets the amplitude and phase of each sub-carrier input from the sub-carrier generation unit 31 on the basis of the table data.

12 Claims, 7 Drawing Sheets

| Table number | Sub-carrier number | Amplitude value | Phase value |
|---|---|---|---|
| 0 | 0 | X[0][0] | Y[0][0] |
| | ⋮ | ⋮ | ⋮ |
| | K-1 | X[0][K-1] | Y[0][K-1] |
| 1 | 0 | X[1][0] | Y[1][0] |
| | ⋮ | ⋮ | ⋮ |
| | K-1 | X[1][K-1] | Y[1][K-1] |
| ⋮ | | | |
| N-2 | 0 | X[N-2][0] | Y[N-2][0] |
| | ⋮ | ⋮ | ⋮ |
| | K-1 | X[N-2][K-1] | Y[N-2][K-1] |
| N-1 | 0 | X[N-1][0] | Y[N-1][0] |
| | ⋮ | ⋮ | ⋮ |
| | K-1 | X[N-1][K-1] | Y[N-1][K-1] |

FIG. 2

SIGNAL GENERATION DEVICE, MOBILE COMMUNICATION TERMINAL TEST DEVICE INCLUDING THE SAME, SIGNAL GENERATION METHOD, AND MOBILE COMMUNICATION TERMINAL TEST METHOD

TECHNICAL FIELD

The present invention relates to a signal generation device that generates a signal for testing mobile communication terminals, such as mobile phones or mobile terminals, a mobile communication terminal test device including the same, a signal generation method, and a mobile communication terminal test method.

BACKGROUND ART

When mobile communication terminals, such as mobile phones or data communication terminals, are newly developed, it is necessary to test whether the developed mobile communication terminal normally performs communication. For the test, a waveform generation device which generates a signal with the waveform which the user wants is prepared and a signal with a predetermined waveform is input to the mobile communication terminal to check the performance of the mobile communication terminal. For example, Patent Document 1 discloses this type of waveform generation device.

The waveform generation device disclosed in Patent Document 1 includes waveform control means for reading stored waveform data, amplitude control means for setting the amplitude of the waveform data, a phase control unit that sets the phase of the waveform data, and setting input means which is used by the user to set the amplitude or phase and can output the waveform data with the amplitude or phase set to the value which the user wants.

PRIOR ART DOCUMENT

Patent Document

[Patent Document 1] Japanese Unexamined Patent Application Publication No. 2006-29862

DISCLOSURE OF THE INVENTION

Problem that the Invention is to Solve

However, in recent years, in the communication field, a wide bandwidth modulation system, such as an orthogonal frequency division multiplexing (OFDM) modulation system or an orthogonal frequency division multiple access (OFDMA) modulation system, has been used. Therefore, a mobile communication terminal test device which can test mobile communication terminals designed for this type of modulation system is needed. When a broadband transmission signal is transmitted to the mobile communication terminal to test the mobile communication terminal, one of basic performance tests for the mobile communication terminal is a test to check its behavior toward received signal whose amplitude or phase characteristics distorted on frequency domain. In particular, in the mobile communication terminal, amplitude or phase distortion condition of the received signal changes according to the reception position over time. Therefore, it is important to perform the test considering a change in the amplitude-frequency characteristics or the phase-frequency characteristics over time.

However, the waveform generation device disclosed in Patent Document 1 can set the amplitude or phase to a predetermined value, but does not consider a change in the amplitude-frequency characteristics or the phase-frequency characteristics over time. Therefore, the waveform generation device needs to be improved.

The invention has been made in view of the above-mentioned problems and an object of the invention is to provide a signal generation device that can generate a signal with the amplitude-frequency characteristics or the phase-frequency characteristics which are changed over time, a mobile communication terminal test device including the same, a signal generation method, and a mobile communication terminal test method.

Means for Solving the Problem

According to a first aspect of the invention, there is provided a signal generation device that generates a signal in which a plurality of sub-carriers are arranged in a frequency domain. The signal generation device includes sub-carrier generation means (31) for generating the plurality of sub-carriers based on a predetermined modulation system from input data, time domain conversion means (33) for receiving the generated plurality of sub-carriers and converting the plurality of sub-carriers into a signal in a time domain; frequency characteristic storage means (13) for storing data of frequency characteristics for at least one of amplitude-frequency characteristics and phase-frequency characteristics of each of the sub-carriers in advance, and frequency characteristic calculation means (32) for adding the frequency characteristics to each of the sub-carriers generated by the sub-carrier generation means in a predetermined unit of time based on the data of the frequency characteristics and outputting the addition result. The time domain conversion means receives the plurality of sub-carriers output from the frequency characteristic calculation means and converts the sub-carriers into the signal in the time domain.

According to this structure, in the signal generation device according to the first aspect of the invention, the frequency characteristic calculation means adds the frequency characteristics to each of the sub-carriers generated by the sub-carrier generation means in the predetermined time unit on the basis of the data for the frequency characteristics read from the frequency characteristic storage means. Therefore, it is possible to generate a signal in which the amplitude-frequency characteristics or the phase-frequency characteristics are changed over time.

According to a second aspect of the invention, there is provided a mobile communication terminal test device (10) that includes the signal generation device according to the first aspect, transmits the signal generated by the signal generation device as a test signal to a mobile communication terminal (1), receives a response signal to the test signal from the mobile communication terminal, and tests the mobile communication terminal. The mobile communication terminal test device includes test data output means (12) for outputting test data, which is a source of the test signal, as the input data to the sub-carrier generation means, up-conversion means (22) for converting the signal in the time domain into a predetermined radio-frequency test signal and outputting the predetermined radio-frequency test signal to the mobile communication terminal, down-conversion means (41) for receiving a response signal to the test signal from the mobile communication terminal and converting the received signal into a response signal with a predetermined frequency, response signal demodulation means (43) for demodulating the response signal output from the down-conversion means, and analysis means (14) for analyzing the demodulated response signal.

According to this structure, the mobile communication terminal test device according to the second aspect of the invention adds at least one of the amplitude-frequency characteristics and the phase-frequency characteristics of each sub-carrier of the test data in a predetermined time unit on the basis of data for the frequency characteristics read from the frequency characteristic storage means. Therefore, it is possible to generate a signal in which the amplitude-frequency characteristics or the phase-frequency characteristics are changed over time and test the mobile communication terminal using the generated signal.

According to a third aspect of the invention, in the mobile communication terminal test device according to the above-mentioned aspect, the frequency characteristic calculation means may include a plurality of multipliers (32(0) to 32(K−1)) that receive each of the sub-carriers generated by the sub-carrier generation means and the data for at least one of the amplitude-frequency characteristics and the phase-frequency characteristics which is stored in the frequency characteristic storage means in advance and multiply the received data for each sub-carrier.

According to this structure, in the mobile communication terminal test device according to the third aspect of the invention, the frequency characteristic calculation means can receive each sub-carrier which is generated by the sub-carrier generation means and the data for at least one of the amplitude-frequency characteristics and the phase-frequency characteristics which is stored in the frequency characteristic storage means in advance and perform calculation for each sub-carrier.

According to a fourth aspect of the invention, in the mobile communication terminal test device according to the above-mentioned aspect, the frequency characteristic calculation means may include a multiplier (32a) that sequentially receives each sub-carrier generated by the sub-carrier generation means, sequentially receives the data for at least one of the amplitude-frequency characteristics and the phase-frequency characteristics which is stored in the frequency characteristic storage means in advance, and sequentially multiplies each sub-carrier and the data for the frequency characteristics.

According to this structure, in the mobile communication terminal test device according to the fourth aspect of the invention, the frequency characteristic calculation means can sequentially receive each sub-carrier generated by the sub-carrier generation means and the data for at least one of the amplitude-frequency characteristics and the phase-frequency characteristics which is stored in the frequency characteristic storage means in advance and perform calculation.

According to a fifth aspect of the invention, in the mobile communication terminal test device according to the above-mentioned aspect, the mobile communication terminal may output a response signal including reception condition data indicating the reception conditions of the test signal to the down-conversion means. The analysis means may analyze the reception condition data on the basis of the data for at least one of the amplitude-frequency characteristics and the phase-frequency characteristics which is output from the frequency characteristic storage means to the frequency characteristic calculation means.

According to this structure, the mobile communication terminal test device according to the fifth aspect of the invention can analyze at least one of the amplitude-frequency characteristics and the phase-frequency characteristics added by the frequency characteristic calculation means on the basis of the reception condition data.

According to a sixth aspect of the invention, in the mobile communication terminal test device according to the above-mentioned aspect, the frequency characteristic calculation means may add at least one of the amplitude-frequency characteristics and the phase-frequency characteristics of each sub-carrier in a time unit of any one of a frame, a sub-frame, a slot, and a symbol as the predetermined time unit.

According to this structure, the mobile communication terminal test device according to the sixth aspect of the invention can synchronize the timing of changing the amplitude characteristics or phase characteristics of a signal with such as a frame, a sub-frame, a slot, or a symbol generation and reduce the influence of discontinuity at the change point of the amplitude characteristics or phase characteristics of the signal.

According to a seventh aspect of the invention, in the mobile communication terminal test device according to the above-mentioned aspect, the mobile communication terminal may include a plurality of antennas and the signal generation devices and the up-conversion means may be provided so as to correspond to each of the antennas.

According to this structure, the mobile communication terminal test device according to the seventh aspect of the invention can add at least one of the amplitude-frequency characteristics and the phase-frequency characteristics for each antenna to the mobile communication terminal with the plurality of antennas to test the mobile communication terminal.

According to an eighth aspect of the invention, there is provided a signal generation method that generates a signal in which a plurality of sub-carriers are arranged in a frequency domain. The signal generation method includes a sub-carrier generation step (S12) of generating the plurality of sub-carriers based on a predetermined modulation system from input data, a time domain conversion step (S14) of converting the generated plurality of sub-carriers into a signal in a time domain, and a frequency characteristic calculation step (S13) of adding, based on data of frequency characteristics for at least one of amplitude-frequency characteristics and phase-frequency characteristics of each of the sub-carriers which is stored in advance, the frequency characteristics to each of the sub-carriers generated in the sub-carrier generation step in a predetermined time unit and outputting the addition result. The time domain conversion step converts the plurality of sub-carriers output in the frequency characteristic calculation step into the signal in the time domain.

According to this structure, in the signal generation method according to the eighth aspect of the invention, the frequency characteristic calculation step adds at least one of the amplitude-frequency characteristics and the phase-frequency characteristics of each sub-carrier generated in the sub-carrier generation step in a predetermined time unit on the basis of data for the frequency characteristics read from the frequency characteristic storage means. Therefore, it is possible to generate a signal in which the amplitude-frequency characteristics or the phase-frequency characteristics are changed over time.

According to a ninth aspect of the invention, there is provided a mobile communication terminal test method that includes the signal generation method according to the eighth aspect, transmits the signal generated by the signal generation method as a test signal to a mobile communication terminal (1), receives a response signal to the test signal from the mobile communication terminal, and tests the mobile communication terminal. The mobile communication terminal test method includes a test data output step (S11) of outputting test data, which is a source of the test signal, as the input data, an up-conversion step (S15) of converting the signal in the time domain into a predetermined radio-frequency test signal and outputting the predetermined radio-frequency test signal to the mobile communication terminal, a down-conversion step (S16) of receiving a response signal to the test signal from the mobile communication terminal and converting the received response signal into a response signal with a predetermined frequency, a response signal demodulation step (S17) of demodulating the response signal output in the down-conversion step, and an analysis step (S19) of analyzing the demodulated response signal.

According to this structure, the mobile communication terminal test method according to the ninth aspect of the invention adds at least one of the amplitude-frequency characteristics and the phase-frequency characteristics of each sub-carrier of the test data in a predetermined time unit on the basis of data for the frequency characteristics read from the frequency characteristic storage means. Therefore, it is possible to generate a signal in which the amplitude-frequency characteristics or the phase-frequency characteristics are changed over time and to test the mobile communication terminal using the generated signal.

Advantage of the Invention

The invention can provide a signal generation device that can generate a signal in which the amplitude-frequency characteristics or the phase-frequency characteristics are changed over time, a mobile communication terminal test device including the same, a signal generation method, and a mobile communication terminal test method.

BRIEF DESCRIPTION OF THE DRAWINGS

FIG. 2 is a diagram illustrating an example of table data in the mobile communication terminal test device according to the embodiment of the invention.

BEST MODE FOR CARRYING OUT THE INVENTION

Hereinafter, an embodiment of the invention will be described with reference to the drawings.

First, the structure of a mobile communication terminal test device according to an embodiment of the invention will be described.

Figure 1:
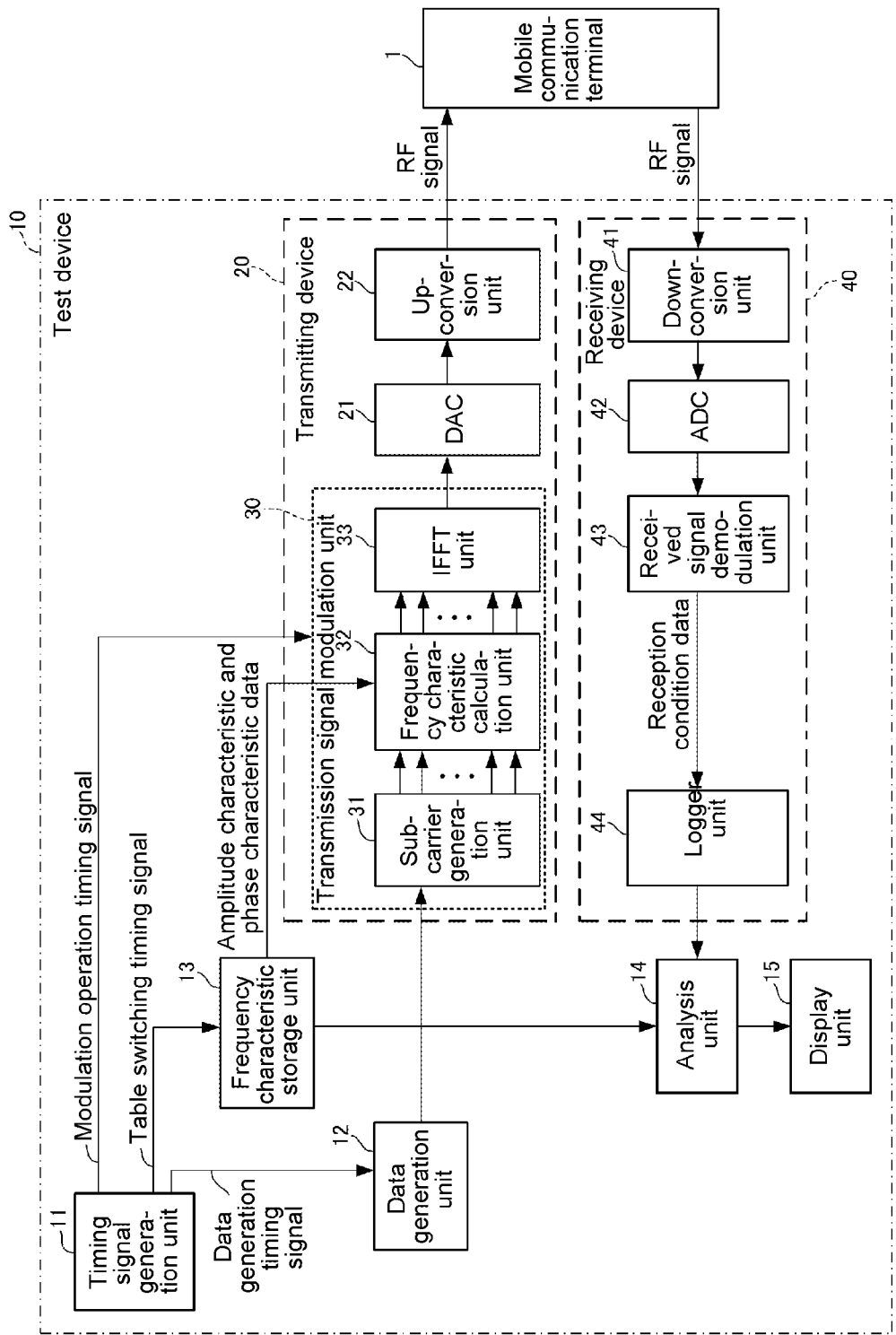
FIG. 1 is a block diagram illustrating a mobile communication terminal test device according to an embodiment of the invention.

As shown in FIG. 1, a mobile communication terminal test device 10 according to this embodiment transmits a radio frequency (RF) signal in an RF band to a mobile communication terminal 1, which is a terminal being tested, through a coaxial cable (not shown) and receives an RF signal, which is a response to the transmission signal, from the mobile communication terminal 1 to test the mobile communication terminal 1. It is assumed that the mobile communication terminal 1 is designed for an OFDM modulation system or an OFDMA modulation system.

Specifically, the mobile communication terminal test device 10 includes a timing signal generation unit 11, a data generation unit 12, a frequency characteristic storage unit 13, an analysis unit 14, a display unit 15, a transmitting device 20, and a receiving device 40. In this embodiment, the mobile communication terminal 1 includes one antenna and one transmitting device 20 is provided.

The transmitting device 20 includes a transmission signal modulation unit 30, a digital/analog converter (DAC) 21, and an up-conversion unit 22. The transmission signal modulation unit 30 includes a sub-carrier generation unit 31, a frequency characteristic calculation unit 32, and an inverse fast Fourier transform (IFFT) unit 33. The receiving device 40 includes a down-conversion unit 41, an analog/digital converter (ADC) 42, a received signal demodulation unit 43, and a logger unit 44. In FIG. 1, the frequency characteristic storage unit 13, the sub-carrier generation unit 31, the frequency characteristic calculation unit 32, and the IFFT unit 33 form a signal generation device according to the invention.

The timing signal generation unit 11 generates timing signals required for the operation of each unit of the mobile communication terminal test device 10 and outputs the timing signals. In particular, the timing signal generation unit 11 generates the timing signals based on a time unit in communication with the mobile communication terminal 1, for example, a frame, a sub-frame, a slot, or a symbol and outputs the timing signals to the data generation unit 12, the frequency characteristic storage unit 13, and the transmission signal modulation unit 30. FIG. 1 shows only three timing signals among the timing signals output from the timing signal generation unit 11 and does not show the other timing signals. That is, FIG. 1 shows a data generation timing signal which is output from the timing signal generation unit 11 to the data generation unit 12, a table switching timing signal which is output from the timing signal generation unit 11 to the frequency characteristic storage unit 13, and a modulation operation timing signal which is output from the timing signal generation unit 11 to the transmission signal modulation unit 30.

The data generation unit 12 generates a bit stream, which is the basis of the RF signal transmitted to the mobile communication terminal 1, on the basis of user setting information which is set by the user through an operation unit (not shown) and outputs the bit stream to the sub-carrier generation unit 31. The data generation unit 12 forms test data output means according to the invention.

The frequency characteristic storage unit 13 stores table data for predetermined amplitude-frequency characteristics and predetermined phase-frequency characteristics. The table data is applied to each sub-carrier. The frequency characteristic storage unit 13 outputs the table data designated by the user to the frequency characteristic calculation unit 32 on the basis of the table switching timing signal from the timing signal generation unit 11. The frequency characteristic storage unit 13 forms frequency characteristic storage means according to the invention.

The table data stored by the frequency characteristic storage unit 13 will be described with reference to FIG. 2.

As shown in FIG. 2, the frequency characteristic storage unit 13 stores N table data items (N is an integer) with table numbers 0 to N−1. These table data items are time-series data items with table numbers 0 to N−1. That is, the table number corresponds to time.

In each table data, the amplitude and phase of each of sub-carriers with sub-carrier numbers 0 to K−1 (K is an integer) are determined. As the sub-carrier number increases from 0 to K−1, the frequency of the sub-carrier increases. That is, the sub-carrier number corresponds to the frequency of the sub-carrier.

In FIG. 2, the amplitude is represented by X[N−1][K−1] and the phase is represented by Y[N−1][K−1]. For example, for table number 1, a sub-carrier with sub-carrier number 0 has an amplitude X[1][0] and a phase Y[1][0].

In the example of the table data shown in FIG. 2, data for frequency characteristics is represented by the amplitude X and the phase Y. However, the data may be represented by an I-phase and a Q-phase in the rectangular coordinate system. That is, the data for frequency characteristics represented by the amplitude X and the phase Y can be represented by an I-phase=X·cos Y and a Q-phase=X·sin Y. Data for the I-phase and the Q-phase may be stored instead of data for the amplitude value and the phase value in the table data shown in FIG. 2.

Returning to FIG. 1, the sub-carrier generation unit receives the bit stream data output from the data generation unit 12, performs, for example, predetermined encoding, symbol mapping, or sub-carrier mapping to convert the data into a plurality of sub-carriers for the OFDM modulation system, and outputs the sub-carriers to the frequency characteristic calculation unit 32. The sub-carrier generation unit 31 forms sub-carrier generation means according to the invention.

Figure 3:
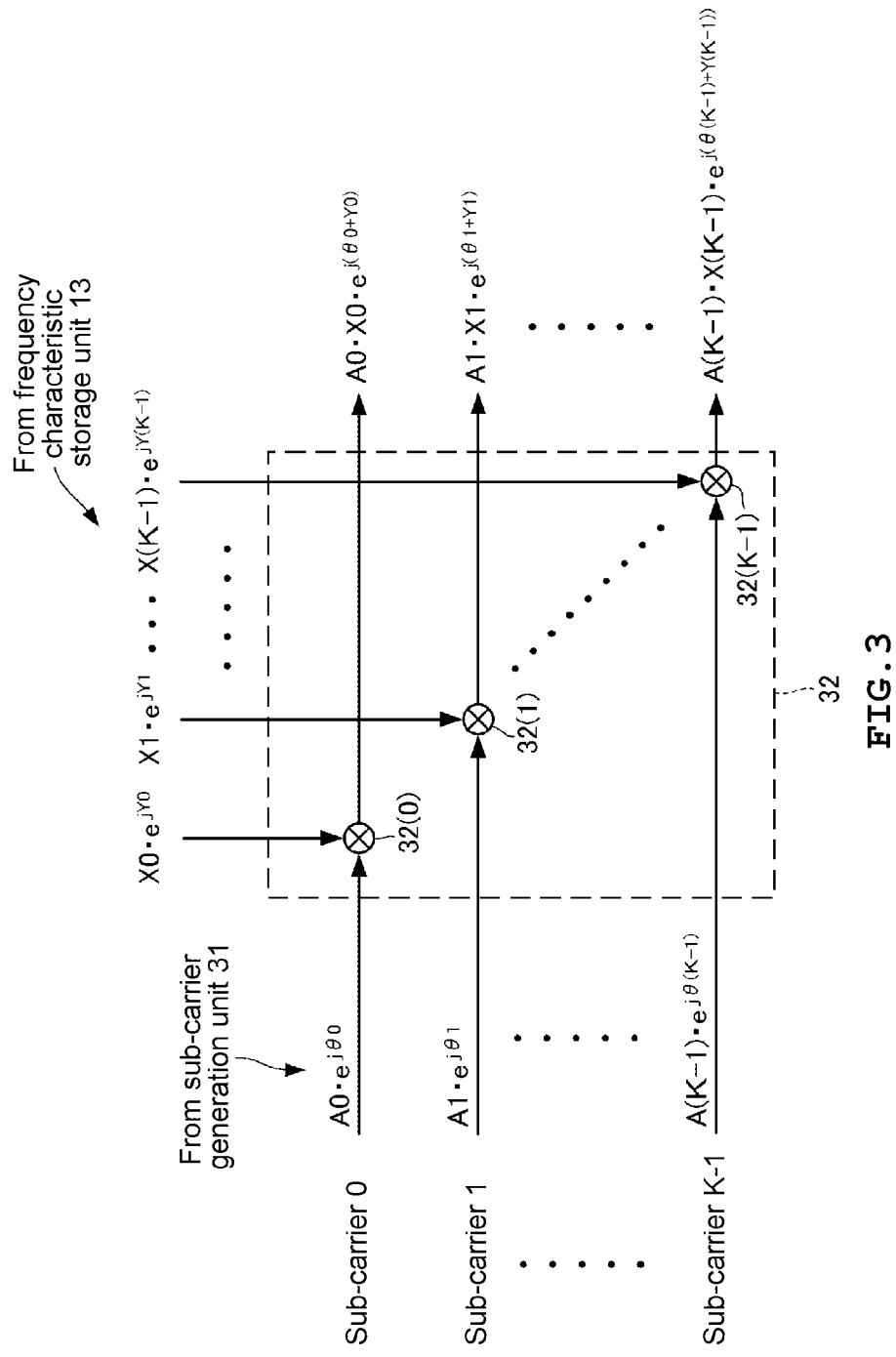
FIG. 3 is a block diagram illustrating an amplitude-phase characteristic calculation unit in the mobile communication terminal test device according to the embodiment of the invention.

The frequency characteristic calculation unit 32 applies the amplitude and phase data input from the frequency characteristic storage unit 13 to each sub-carrier generated by the sub-carrier generation unit 31. The frequency characteristic calculation unit 32 forms frequency characteristic calculation means according to the invention. FIG. 3 shows an example of the structure of the frequency characteristic calculation unit 32. Hereinafter, for example, a sub-carrier with sub-carrier number 0 is referred to as a "sub-carrier 0".

As shown in FIG. 3, the frequency characteristic calculation unit 32 receives sub-carriers 0 to K−1 from the sub-carrier generation unit 31, receives the table data from the frequency characteristic storage unit 13, and includes K multipliers 32(0) to 32(K−1).

The multiplier 32(0) performs a complex multiplication of $A0·e^{j\theta0}$ which is the signal value of the sub-carrier 0 and table data $X0·e^{jY0}$ which has a predetermined table number and corresponds to the sub-carrier 0 (where A and X indicate the amplitude and θ and Y indicate the phase). For example, when table data with table number 1 shown in FIG. 2 is used, the multiplier 32(0) uses the value of X[1][0] as X0 and uses the value of Y[1][0] as Y0.

Similarly, the multiplier 32(1) performs a complex multiplication of $A1·e^{j\theta1}$ which is the signal value of a sub-carrier 1 and table data $X1·e^{jY1}$ corresponding to the sub-carrier 1. The multiplier 32(K−1) performs a complex multiplication of $A(K-1)·e^{j\theta(K-1)}$ which is the signal value of a sub-carrier K−1 and table data $X(K-1)·e^{jY(K-1)}$ corresponding to the sub-carrier K−1.

According to the above-mentioned structure, the frequency characteristic calculation unit 32 sets the amplitudes and phases of K sub-carriers 0, 1, . . . , K−1 input from the sub-carrier generation unit 31 on the basis of the table data and outputs signal values $A0·X0·e^{j(\theta0+Y0)}$, $A1·X1·e^{j(\theta1+Y1)}$, . . . , $A(K-1)·X(K-1)·e^{j(\theta(K-1)+Y(K-1))}$ to the IFFT unit 33.

Specifically, the function of the frequency characteristic calculation unit 32 will be described with reference to FIG. 4. In the example shown in FIG. 4, the number of sub-carriers is 25. Hereinafter, for example, a frame with frame number 0 is referred to as a "frame 0" and table data with table number 0 is referred to as a "table 0".

Figure 4:
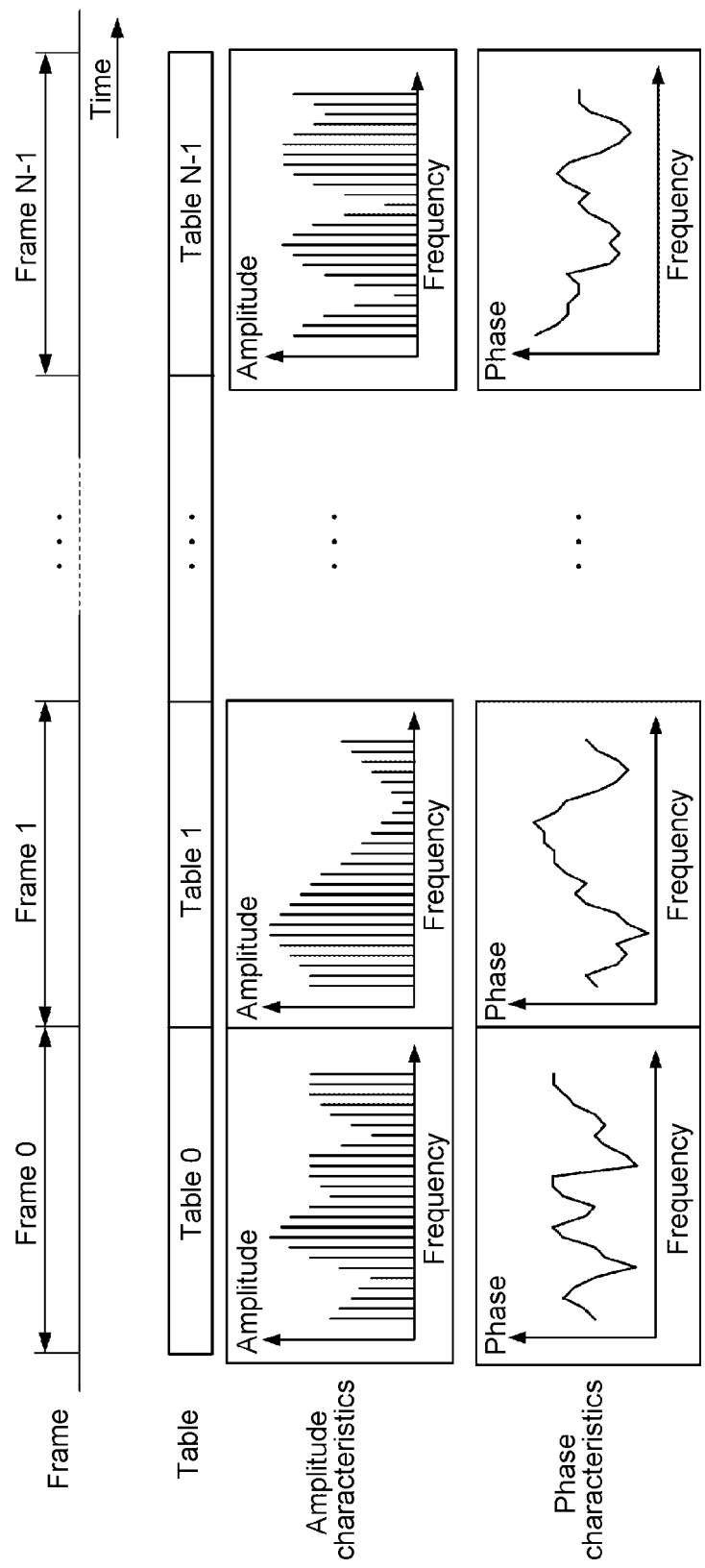
FIG. 4 is a diagram illustrating the function of the amplitude-phase characteristic calculation unit in the mobile communication terminal test device according to the embodiment of the invention.

As shown in FIG. 4, the frequency characteristic calculation unit 32 reads table data from the frequency characteristic storage unit 13 on the basis of a frame generation time. In the example shown in FIG. 4, the frequency characteristic calculation unit 32 reads table data with table number 0 in the frame with frame number 0. Similarly, the frequency characteristic calculation unit 32 reads a table 1 from a frame 1 and reads a table N−1 from a frame N−1. The read timing of the table data is not limited to the frame generation time, but the table data may be read at any time (symbol unit). It is preferable that the table data be read at the timing of a frame, a sub-frame, or a slot generation. The reason is as follows. In the mobile communication system, in many cases, a reference signal for estimating a transmission path or a pilot symbol is regularly multiplexed and transmitted at a specific time interval. Therefore, when a change in the amplitude characteristics or phase characteristics of signals is synchronized with the generation timing of the frame, the sub-frame, or the slot, it is possible to reduce the influence of discontinuity at the change point.

FIG. 4 shows an example in which the table data is changed for each frame. However, the same table data may be used for a plurality of consecutive frames (or sub-frames, slots, or symbols). For example, table data with table number 0 may be used for frames 0 to 10 and table data with table number 1 may be used for frames 11 to 14. In this case, the user may set the relationship between the frame number and the table data used for the frame number in the timing signal generation unit 11 in advance. Then, the timing signal generation unit 11 outputs the table switching timing signal on the basis of the settings.

Then, the frequency characteristic calculation unit performs a complex multiplication of the table data read from the frequency characteristic storage unit 13 and the sub-carrier generated by the data generation unit 12. As a result, the frequency characteristic calculation unit can obtain each sub-carrier with the amplitude characteristics and phase characteristics based on the table data for each frame, as schematically shown in FIG. 4. That is, the frequency characteristic calculation unit can obtain each sub-carrier with the amplitude characteristics and phase characteristics which are changed over time with respect to the amplitude-frequency characteristics and the phase-frequency characteristics, on the basis of the table data.

Figure 5:
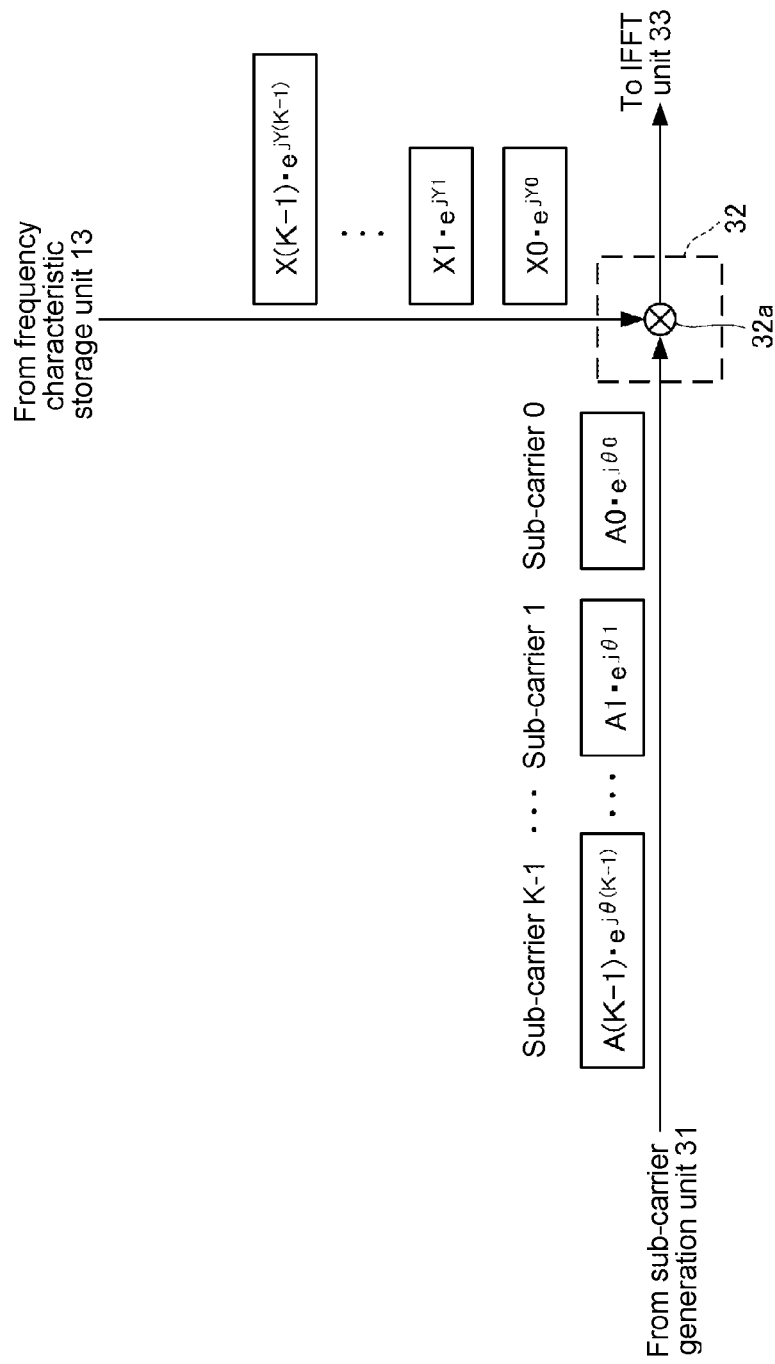
FIG. 5 is a block diagram illustrating another example of the amplitude-phase characteristic calculation unit in the mobile communication terminal test device according to the embodiment of the invention.

FIG. 5 shows another example of the structure of the frequency characteristic calculation unit 32. The frequency characteristic calculation unit 32 shown in FIG. 5 includes a multiplier 32a. The multiplier 32a sequentially receives the sub-carriers 0, 1, . . . , K−1 from the sub-carrier generation unit 31. In addition, the multiplier 32a sequentially receives table data items $X0·e^{jY0}$, $X1·e^{jY1}$, . . . , $X(K-1)·e^{jY(K-1)}$ corresponding to the sub-carriers 0, 1, . . . , K−1 with predetermined table numbers from the frequency characteristic storage unit 13. Then, the multiplier 32a sequentially performs a complex multiplication of two input values and outputs signal values $A0 \cdot X0 \cdot e^{j(\Theta 0+Y0)}$, $A1 \cdot X1 \cdot e^{j(\Theta 1+Y1)}$, ..., $A(K-1) \cdot X(K-1) \cdot e^{j(\Theta(K-1)+Y(K-1))}$ to the IFFT unit 33.

The frequency characteristic calculation unit 32 may read the table data stored in the I-phase and the Q-phase format and multiply an I-phase component and a Q-phase component of each sub-carrier by the read data.

Returning to FIG. 1, the IFFT unit 33 performs an inverse fast Fourier transform process for each sub-carrier from the frequency characteristic calculation unit to convert each sub-carrier into a signal in a time domain. The IFFT unit 33 forms time domain conversion means according to the invention.

The DAC 21 converts a digital signal output from the IFFT unit 33 into an analog signal and outputs the analog signal to the up-conversion unit 22.

The up-conversion unit 22 converts the output signal from the DAC 21 into an RF signal with a predetermined frequency and outputs the RF signal as a test signal to the mobile communication terminal 1 through a coaxial cable (not shown). The up-conversion unit 22 forms up-conversion means according to the invention.

When receiving the test signal, the mobile communication terminal 1 outputs a response signal to the test signal to the down-conversion unit 41. The response signal which is output by the mobile communication terminal 1 includes reception condition data indicating the reception conditions of the test signal received by the mobile communication terminal 1. The reception condition data indicates reception conditions in a downlink from the mobile communication terminal test device 10 to the mobile communication terminal 1 and includes the amplitude characteristics and phase characteristics on the frequency axis which are set by the frequency characteristic calculation unit 32.

The down-conversion unit 41 receives the response signal from the mobile communication terminal 1, converts the response signal into a signal with a predetermined frequency, and outputs the converted signal to the ADC 42. The down-conversion unit 41 forms down-conversion means according to the invention.

The ADC 42 converts an analog signal output from the down-conversion unit 41 into a digital signal and outputs the digital signal to the received signal demodulation unit 43.

The received signal demodulation unit 43 demodulates the signal output from the ADC 42 to generate a digital bit stream and acquires downlink reception condition data from the mobile communication terminal 1 which is included in the bit stream.

The logger unit 44 stores the downlink reception condition data received from the mobile communication terminal 1 as time-series log information.

The analysis unit 14 compares the amplitude characteristics and phase characteristics set by the transmission signal modulation unit 30 with log information which corresponds to the amplitude characteristics and phase characteristics and is stored in the logger unit 44 so that it analyzes the downlink reception condition data. The analysis unit 14 forms analysis means according to the invention.

The display unit 15 displays the analysis result of the analysis unit 14. For example, the display unit 15 displays information indicating the transmission path estimation capability or behavior of the mobile communication terminal 1 in the downlink.

Next, the functions of the analysis unit 14 and the display unit 15 will be described in detail.

The mobile communication terminal 1 estimates downlink transmission path conditions on the basis of the reference signal RS included in the transmission signal which is transmitted from the mobile communication terminal test device 10 and feeds back feedback information to the mobile communication terminal test device 10 through an uplink from the mobile communication terminal 1 to the mobile communication terminal test device 10.

When a modulation system, such as an OFDM modulation system or an OFDMA modulation system, is used, a reference signal which is scattered to a resource element in a frequency direction and a time direction can be used as the reference signal from the mobile communication terminal test device 10. An example of the feedback information based on the transmission path conditions which are estimated using this type of reference signal is information indicating transmission path conditions, such as a frequency response and a received signal-to-interference plus noise power ratio.

Figure 6:
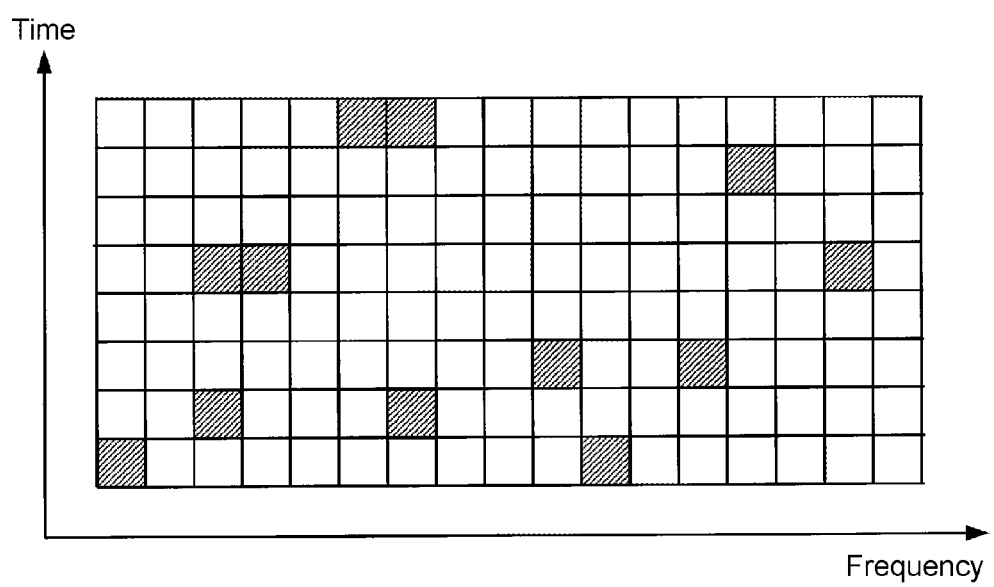
FIG. 6 is a diagram illustrating an example of the display of transmission path conditions in the mobile communication terminal test device according to the embodiment of the invention.

Then, the analysis unit 14 displays the information indicating the transmission path conditions which are obtained from the comparison result between the amplitude characteristics and phase characteristics set by the transmission signal modulation unit 30 and the log information stored in the logger unit 44 on the display unit 15 in a matrix along the time axis and the frequency axis, as shown in FIG. 6. The user may operate the operation unit (not shown) to set the unit of each section along the time axis and the frequency axis, or the setting of the transmission signal may be automatically applied. When there is a region in which predetermined information indicating the obtained transmission path conditions is greater than a predetermined threshold value (for example, a hatched region in FIG. 6) it is preferable that the analysis unit 14 display the region so that the region is distinguished from other regions. For example, the display color of the region is changed or the region blinks.

Since the analysis unit 14 and the display unit 15 have the above-mentioned structures, the mobile communication terminal test device 10 enables the user to visually recognize the information indicating the transmission path conditions with ease.

In practice, the transmitting device based on the orthogonal frequency division multiplexing system, such as the OFDM modulation system or the OFDMA modulation system, has a structure which performs, for example, a guard interval insertion process, a process of separately performing D/A conversion for an I-phase component and a Q-phase component, and an quadrature modulation process for the I-phase component and the Q-phase component. However, in this embodiment, for simplicity of explanation, the description of this structure is omitted.

Figure 7:
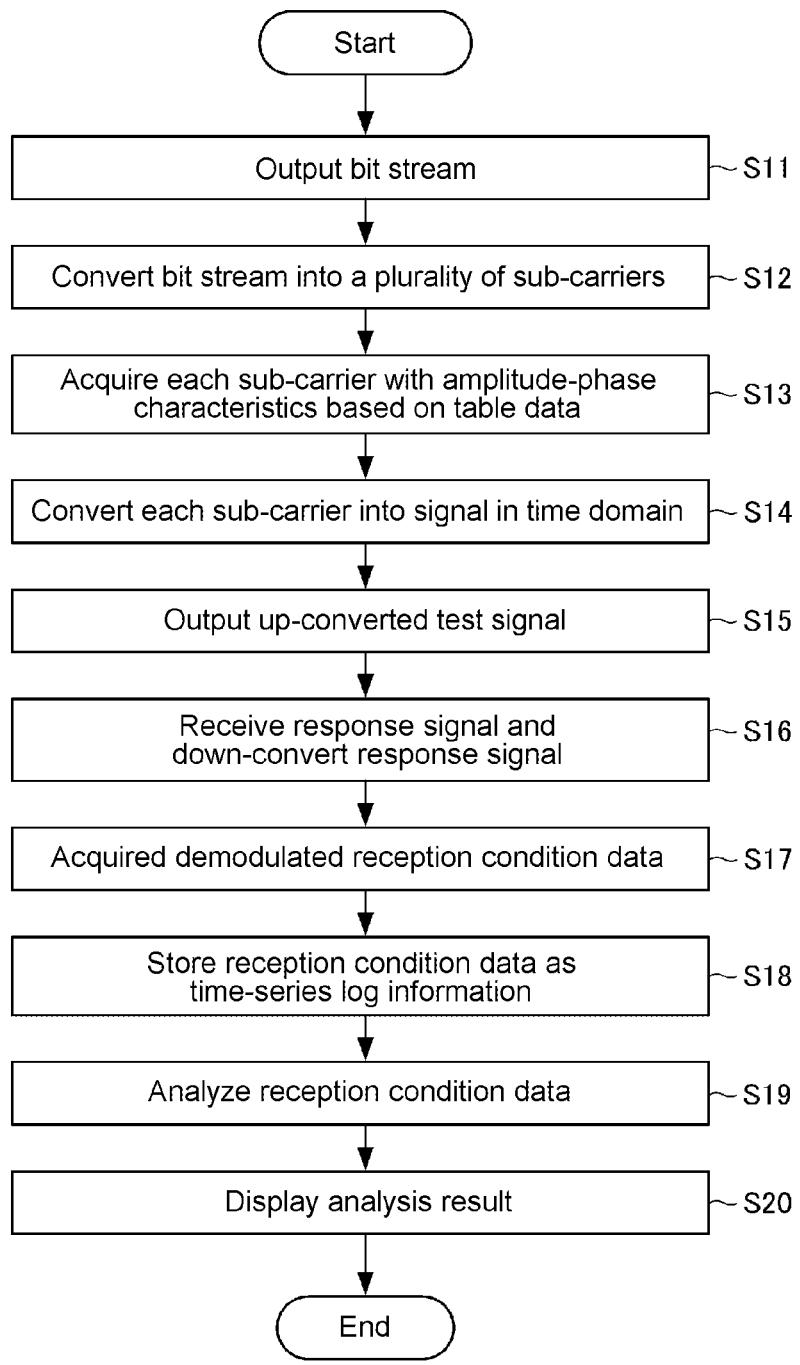
FIG. 7 is a flowchart illustrating the operation of the mobile communication terminal test device according to the embodiment of the invention.

Next, the operation of the mobile communication terminal test device 10 according to this embodiment will be described with reference to the flowchart shown in FIG. 7.

The data generation unit 12 generates a bit stream, which is the basis of the RF signal transmitted to the mobile communication terminal 1, on the basis of the user setting information which is set by the user through the operation unit (not shown) and outputs the generated bit stream to the sub-carrier generation unit 31 (Step S11).

The sub-carrier generation unit 31 performs, for example, predetermined encoding, symbol mapping, or sub-carrier mapping for the input bit stream data to convert the bit stream data into a plurality of sub-carriers based on the OFDM modulation system and outputs the sub-carriers to the frequency characteristic calculation unit 32 (Step S12).

The frequency characteristic calculation unit 32 performs a complex multiplication of each sub-carrier from the sub-carrier generation unit 31 and each table data item for the amplitude and phase, which is input from the frequency characteristic storage unit 13 for each frame, for each sub-carrier and obtains each sub-carrier with the amplitude characteristics and phase characteristics based on the table data (Step S13). The frequency characteristic calculation unit 32 outputs each sub-carrier obtained by the complex multiplication to the IFFT unit 33.

The IFFT unit 33 performs the inverse fast Fourier transform process for each sub-carrier from the frequency characteristic calculation unit 32 to convert each sub-carrier into a signal in the time domain (Step S14) and outputs the converted signal to the DAC 21 on the basis of a signal output timing signal (not shown) included in the modulation operation timing signal from the timing signal generation unit 11.

The DAC 21 converts a digital signal which has been converted from the signal in the time domain by the IFFT unit 33 into an analog signal and outputs the analog signal to the up-conversion unit 22. The up-conversion unit 22 up-converts the output signal from the DAC 21 into an RF signal with a predetermined frequency and outputs the RF signal as a test signal to the mobile communication terminal 1 through a coaxial cable (not shown) (Step S15).

The down-conversion unit 41 receives a response signal from the mobile communication terminal 1, down-converts the response signal into a signal with a predetermined frequency, and outputs the converted signal to the ADC 42 (Step S16).

The ADC 42 converts the analog signal output from the down-conversion unit 41 into a digital signal and outputs the digital signal to the received signal demodulation unit 43. The received signal demodulation unit 43 demodulates the output signal from the ADC 42 to generate a digital bit stream and acquires downlink reception condition data included in the bit stream from the mobile communication terminal 1 (Step S17). The downlink reception condition data is stored in the logger unit 44.

The logger unit 44 stores the downlink reception condition data received from the mobile communication terminal 1 as time-series log information (Step S18).

The analysis unit 14 compares the amplitude characteristics and phase characteristics set by the transmission signal modulation unit 30 with the corresponding log information stored in the logger unit 44 and analyzes the downlink reception condition data (Step S19). The display unit 15 displays the analysis result of the analysis unit 14 (Step S20).

As described above, in the mobile communication terminal test device 10 according to this embodiment, the frequency characteristic calculation unit 32 sets the amplitude-frequency characteristics and the phase-frequency characteristics of each sub-carrier generated by the sub-carrier generation means for each frame on the basis of data for the frequency characteristics read from the frequency characteristic storage means. It is possible to generate a signal with the amplitude-frequency characteristics or the phase-frequency characteristics which are changed over time and test the mobile communication terminal using the generated signal.

In addition, in the orthogonal frequency division multiplexing system, such as the OFDM modulation system or the OFDMA modulation system, or the frequency division multiplexing system, such as the SC-FDMA modulation system, during the modulation of transmission data, a process is performed in the frequency domain and then the frequency domain is converted into the time domain by inverse fast Fourier transform. The mobile communication terminal test device 10 according to this embodiment calculates the frequency characteristics of transmission data in the stage in which the process is performed in the frequency domain. Therefore, the mobile communication terminal test device 10 according to this embodiment can easily add the frequency characteristics to the transmission signal without using an external device (for example, a fading simulator) for adding the frequency characteristics.

In the above-mentioned multiplexing system, the transmission data which has been converted into data in the time domain by inverse fast Fourier transform is symbol data. Therefore, in the structure according to this embodiment, the frequency characteristics are switched for each symbol. Since the time unit of communication, such as a frame, a sub-frame, or a slot, is a set of symbols, the mobile communication terminal test device 10 according to this embodiment can easily switch the frequency characteristics for each frame, each sub-frame, each slot, or each symbol.

In the above-described embodiment, the frequency characteristic calculation unit 32 sets the amplitude-frequency characteristics and the phase-frequency characteristics of each sub-carrier. However, the invention is not limited thereto, but the frequency characteristic calculation unit 32 may set at least one of the amplitude-frequency characteristics and the phase-frequency characteristics of each sub-carrier.

In the above-described embodiment, the mobile communication terminal 1 includes one antenna. However, the invention is not limited thereto. When the mobile communication terminal 1 includes a plurality of antennas, the mobile communication terminal test device 10 may include the frequency characteristic storage units 13 and the transmitting devices 20 corresponding to the number of antennas and the frequency characteristic storage unit 13 may store each table data item for each antenna.

According to this structure, the mobile communication terminal test device 10 according to this embodiment can appropriately test mobile communication terminals using, for example, a multiple input multiple output (MIMO) technique on the basis of the signal with the amplitude-frequency characteristics or the phase-frequency characteristics which are changed over time under independent conditions through each antenna.

INDUSTRIAL APPLICABILITY

As described above, the mobile communication terminal test device according to the invention can generate the signal with the amplitude-frequency characteristics or the phase-frequency characteristics which are changed over time and can be used as a signal generation device which generates a signal for testing mobile communication terminals, such as mobile phones or mobile terminals, a mobile communication terminal test device including the signal generation device, a signal generation method, and a mobile communication terminal test method.

DESCRIPTION OF REFERENCE NUMERALS AND SIGNS

1: MOBILE COMMUNICATION TERMINAL
10: MOBILE COMMUNICATION TERMINAL TEST DEVICE
11: TIMING SIGNAL GENERATION UNIT
12: DATA GENERATION UNIT (TEST DATA OUTPUT MEANS)
13: FREQUENCY CHARACTERISTIC STORAGE UNIT (FREQUENCY CHARACTERISTIC STORAGE MEANS)
14: ANALYSIS UNIT (ANALYSIS MEANS)
15: DISPLAY UNIT

20: TRANSMITTING DEVICE
21: DAC
22: UP-CONVERSION UNIT (UP-CONVERSION MEANS)
30: TRANSMISSION SIGNAL MODULATION UNIT
31: SUB-CARRIER GENERATION UNIT (SUB-CARRIER GENERATION MEANS)
32: FREQUENCY CHARACTERISTIC CALCULATION UNIT (FREQUENCY CHARACTERISTIC CALCULATION MEANS)
32(0), 32(1), 32(K−1), 32A: MULTIPLIER
33: IFFT UNIT (TIME DOMAIN CONVERSION MEANS)
40: RECEIVING DEVICE
41: DOWN-CONVERSION UNIT (DOWN-CONVERSION MEANS)
42: ADC
43: RECEIVED SIGNAL DEMODULATION UNIT
44: LOGGER UNIT

What is claimed is:

1. A mobile communication terminal test device that includes a signal generation device in which a plurality of sub-carriers are arranged in a frequency domain, transmits the signal generated by the signal generation device as a test signal to a mobile communication terminal, receives a response signal to the test signal from the mobile communication terminal, and tests the mobile communication terminal, comprising:
sub-carrier generation means for generating the plurality of sub-carriers based on a predetermined modulation system from input data;
time domain conversion means for receiving the generated plurality of sub-carriers and converting the plurality of sub-carriers into a signal in a time domain;
frequency characteristic storage means for storing data of frequency characteristics for at least one of amplitude-frequency characteristics and phase-frequency characteristics of each of the sub-carriers in advance;
frequency characteristic calculation means for adding the frequency characteristics to each of the sub-carriers generated by the sub-carrier generation means in a predetermined time unit based on the data of the frequency characteristics and outputting the addition result;
test data output means for outputting test data, which is a source of the test signal, as the input data to the sub-carrier generation means;
up-conversion means for converting the signal in the time domain into a predetermined radio-frequency test signal and outputting the predetermined radio-frequency test signal to the mobile communication terminal;
down-conversion means for receiving a response signal to the test signal from the mobile communication terminal and converting the received signal into a response signal with a predetermined frequency;
response signal demodulation means for demodulating the response signal output from the down-conversion means; and
analysis means for analyzing the demodulated response signal,
wherein the time domain conversion means receives the plurality of sub-carriers output from the frequency characteristic calculation means and converts the sub-carriers into the signal in the time domain.

2. The mobile communication terminal test device according to claim 1,
wherein the frequency characteristic calculation means includes a plurality of multipliers that receive each of the sub-carriers generated by the sub-carrier generation means and the data for at least one of the amplitude-frequency characteristics and the phase-frequency characteristics which is stored in the frequency characteristic storage means in advance and multiply the received data for each sub-carrier.

3. The mobile communication terminal test device according to claim 1,
wherein the frequency characteristic calculation means includes a multiplier that sequentially receives each sub-carrier generated by the sub-carrier generation means, sequentially receives the data for at least one of the amplitude-frequency characteristics and the phase-frequency characteristics which is stored in the frequency characteristic storage means in advance, and sequentially multiplies each sub-carrier and the data for the frequency characteristics.

4. The mobile communication terminal test device according to claim 1,
wherein the mobile communication terminal outputs a response signal including reception condition data indicating the reception conditions of the test signal to the down-conversion means, and
the analysis means analyzes the reception condition data on the basis of the data for at least one of the amplitude-frequency characteristics and the phase-frequency characteristics which is output from the frequency characteristic storage means to the frequency characteristic calculation means.

5. The mobile communication terminal test device according to claim 1,
wherein the frequency characteristic calculation means adds at least one of the amplitude-frequency characteristics and the phase-frequency characteristics of each sub-carrier in a time unit of any one of a frame, a sub-frame, a slot, and a symbol as the predetermined time unit.

6. The mobile communication terminal test device according to claim 1,
wherein the mobile communication terminal includes a plurality of antennas, and
the signal generation devices and the up-conversion means are provided so as to correspond to each of the antennas.

7. A mobile communication terminal test method that includes a signal generation method that generates a signal in which a plurality of sub-carriers are arranged in a frequency domain, transmits the signal generated by the signal generation method as a test signal to a mobile communication terminal, receives a response signal to the test signal from the mobile communication terminal, and tests the mobile communication terminal, comprising:
a sub-carrier generation step of generating the plurality of sub-carriers based on a predetermined modulation system from input data;
a time domain conversion step of converting the generated plurality of sub-carriers into a signal in a time domain;
a frequency characteristic calculation step of adding, based on data of frequency characteristics for at least one of amplitude-frequency characteristics and phase-frequency characteristics of each of the sub-carriers which is stored in advance, the frequency characteristics to each of the sub-carriers generated in the sub-carrier generation step in a predetermined time unit and outputting the addition result;
a test data output step of outputting test data, which is a source of the test signal, as the input data;

an up-conversion step of converting the signal in the time domain into a predetermined radio-frequency test signal and outputting the predetermined radio-frequency test signal to the mobile communication terminal;

a down-conversion step of receiving a response signal to the test signal from the mobile communication terminal and converting the received signal into a response signal with a predetermined frequency;

a response signal demodulation step of demodulating the response signal output in the down-conversion step; and an analysis step of analyzing the demodulated response signal, wherein the time domain conversion step converts the plurality of sub-carriers output in the frequency characteristic calculation step into the signal in the time domain.

8. The mobile communication terminal test method according to claim 7, wherein the frequency characteristic calculation step multiplies each sub-carrier generated in the sub-carrier generation step and the data for at least one of the amplitude-frequency characteristics and the phase-frequency characteristics which is stored in advance for each sub-carrier.

9. The mobile communication terminal test method according to claim 7, wherein the frequency characteristic calculation step sequentially receives each sub-carrier generated in the sub-carrier generation step, sequentially receives the data for at least one of the amplitude-frequency characteristics and the phase-frequency characteristics which is stored in advance, and sequentially multiplies each sub-carrier and the data for the frequency characteristics.

10. The mobile communication terminal test method according to claim 7, wherein the down-conversion step receives a response signal including reception condition data indicating the reception conditions of the test signal from the mobile communication terminal, and the analysis step analyzes the reception condition data on the basis of the data for at least one of the amplitude-frequency characteristics and the phase-frequency characteristics which is added in the frequency characteristic calculation step.

11. The mobile communication terminal test method according to claim 7, wherein the frequency characteristic calculation step adds at least one of the amplitude-frequency characteristics and the phase-frequency characteristics of each sub-carrier in a time unit of any one of a frame, a sub-frame, a slot, and a symbol as the predetermined time unit.

12. The mobile communication terminal test method according to claim 7, wherein the mobile communication terminal includes a plurality of antennas, and the mobile communication terminal test method includes the sub-carrier generation step, the frequency characteristic calculation step, the time domain conversion step, and the up-conversion step that correspond to each of the antennas.

\* \* \* \* \*